(12) United States Patent
Fukasawa (10) Patent No.: US 8,867,073 B2
(45) Date of Patent: Oct. 21, 2014

(54) SERVER APPARATUS, NETWORK SYSTEM, JOB PROCESSING METHOD, AND STORAGE MEDIUM

(75) Inventor: Nobuaki Fukasawa, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 522 days.

(21) Appl. No.: 13/216,904

(22) Filed: Aug. 24, 2011

(65) Prior Publication Data

US 2012/0050805 A1    Mar. 1, 2012

(30) Foreign Application Priority Data

Aug. 31, 2010 (JP) ................. 2010-193224

(51) Int. Cl.
G06K 15/02 (2006.01)
H04L 29/08 (2006.01)
G06F 3/12 (2006.01)

(52) U.S. Cl.
CPC ............ *G06F 3/122* (2013.01); *H04L 67/2814* (2013.01); *G06F 3/1288* (2013.01); *G06F 3/1287* (2013.01); *G06F 3/126* (2013.01); *G06F 3/1275* (2013.01)
USPC ...................................................... 358/1.15

(58) Field of Classification Search
None
See application file for complete search history.

(56) References Cited

U.S. PATENT DOCUMENTS 7,650,399 B2 * 1/2010 Fukasawa et al. ............ 709/223
8,411,330 B2 * 4/2013 Fukasawa .................... 358/448
2004/0194012 A1 * 9/2004 Shi ............................... 715/500
2004/0194108 A1 * 9/2004 Masui et al. .................. 718/105
2007/0011241 A1 * 1/2007 Kawabe et al. ............... 709/205
2009/0276493 A1 * 11/2009 Hikawa et al. ............... 709/205
2009/0296143 A1 * 12/2009 Fukasawa .................... 358/1.15
2009/0296144 A1 * 12/2009 Fukasawa .................... 358/1.15
2009/0327454 A1 * 12/2009 Iwasaki ........................ 709/219
2012/0057183 A1 * 3/2012 Tsujimoto .................... 358/1.13
2012/0133968 A1 * 5/2012 Hirose ......................... 358/1.13

FOREIGN PATENT DOCUMENTS

JP    8-249290 A    9/1996

\* cited by examiner

*Primary Examiner* — Mark Zimmerman
*Assistant Examiner* — Lawrence Wills
(74) *Attorney, Agent, or Firm* — Canon USA, Inc., IP Division

(57) ABSTRACT

A server apparatus to manage a service processing apparatus which, based on a job requested from an information processing apparatus, cooperatively processes the job. The generation unit generates, based on cooperation service information stored in the storage unit, cooperation processing information including location information about a service processing apparatus to which the information processing apparatus is to make a cooperation service request, session information indicating a cooperation process, and order information indicating a progress state of a service process. The instruction unit transmits the generated cooperation processing information to the information processing apparatus, and instruct the information processing apparatus about a process. The acquisition unit acquires from the information processing apparatus response information corresponding to the cooperation processing information. The instruction unit specifies a process to be processed next based on the response information acquired by the acquisition unit, and instructs the information processing apparatus about the specified process.

3 Claims, 6 Drawing Sheets

```
<?xml version="1.0" encoding="utf-8"?>    ~601
<!--SESSION INFORMATION-->  ~610
<session>  ~611
   <sid>12345</sid>  ~612
   <starttime>20100622212311</starttime>  ~613
   <maxOrder>2</maxOrder>  ~614
   <currentOrder>1</currentOrder>  ~615

<!--COOPERATION SERVICE INFORMATION-->  ~621
      <conbi-name>pushprint</conbi-name>  ~622
      <services>  ~630
         <URL Order="0">http://ttt.ttt.ttt/dwld.aspx</URL>  ~631
         <URL Order="1">http://ttt.ttt.ttt/conv.aspx</URL>  ~632
         <URL Order="2">http://uuu.uuu.uuu/push.aspx</URL>  ~633
      </services>  ~634

</session>  ~616
```

SERVER APPARATUS, NETWORK SYSTEM, JOB PROCESSING METHOD, AND STORAGE MEDIUM

BACKGROUND

1. Field of the Invention

The present invention relates to a server apparatus, a network system in which an information processing apparatus and a service processing apparatus cooperatively execute a service process, a job processing method, and a storage medium.

2. Description of the Related Art

Japanese Patent Application Laid-Open No. 8-249290 discusses a system in which a job is directly transmitted and received among services.

In this system, when a client generates a job, the utilization sequence and the utilization procedure of a cooperation service are input in the job, and a receiving server executes processing based on the utilization procedure described in the job. Then, the job is transferred to the next server based on the utilization sequence described in the job. Consequently, a processing request can be made to the next service based on the contents of the job without the service having to recognize the details of the next service. Therefore, dependency among the services can be reduced.

In a cooperation system, for example, when the utilization sequence of a service is changed or when a uniform resource locator (URL) of a service is changed, if the utilization sequence up to completion of the service is changed, a service positioned at an earlier stage to that service, specifically, a service requesting processing to the service to be changed, needs to make the request based on a new changed service utilization sequence. More specifically, when the utilization sequence of a predetermined service is changed, in order to provide a cooperation service using the predetermined service, other services relating to the cooperation also have to be changed.

Similarly, when the URL of a predetermined service is changed, other services relating to the cooperation also have to be changed so that the changed URL can be recognized. Thus, if the dependency among the services is large, changing a predetermined service forces the other services to be changed as well, which leads to an increase in the number of changes and a decrease in the operation rate due to stoppage of the whole system during the changes.

SUMMARY OF THE INVENTION

According to an aspect of the present invention, a server apparatus configured to manage a service processing apparatus which, based on a job requested from an information processing apparatus, cooperatively processes the job, includes a storage unit configured to store cooperation service information that includes location information about a plurality of service processing apparatuses that are to execute a cooperation service process specified based on the requested job; a generation unit configured to generate, based on the cooperation service information stored in the storage unit, cooperation processing information including location information about a service processing apparatus to which the information processing apparatus is to make a cooperation service request, session information indicating a cooperation process, and order information indicating a progress state of a service process; an instruction unit configured to transmit the cooperation processing information generated by the generation unit to the information processing apparatus, and instruct the information processing apparatus about a process; and an acquisition unit configured to acquire from the information processing apparatus response information corresponding to the cooperation processing information, wherein the instruction unit specifies a process to be processed next based on the response information acquired by the acquisition unit, and instructs the information processing apparatus about the specified process.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DESCRIPTION OF THE EMBODIMENTS

Various exemplary embodiments, features, and aspects of the invention will be described in detail below with reference to the drawings.

In a conventional example, a client needs to recognize that a predetermined service is a cooperation service when a request for that service is made, and to grasp what order will enable the service to be provided. An example will be considered in which there is a service A, which executes a service 2 based on an execution result of a service 1, then executes a service 3 based on an execution result of the service 2, and is realized by receiving that result.

In this case, the client first needs to recognize that the service A uses the services 1, 2 and 3. Further, the client cannot generate a request of the service A unless he/she grasps the execution procedure of these services. In addition, if the URL of a server providing the service 2 has changed, or if an optimum server is selected based on the load state or operational state when there is a plurality of servers providing the same service 2, the client has to generate the request while considering that information. Specifically, there is a problem that the client/service interdependency is large.

Embodiments are directed towards reducing the dependency between a client and a service that are to be cooperatively executed by an information processing apparatus and the respective service processing apparatuses.

Figure 1:
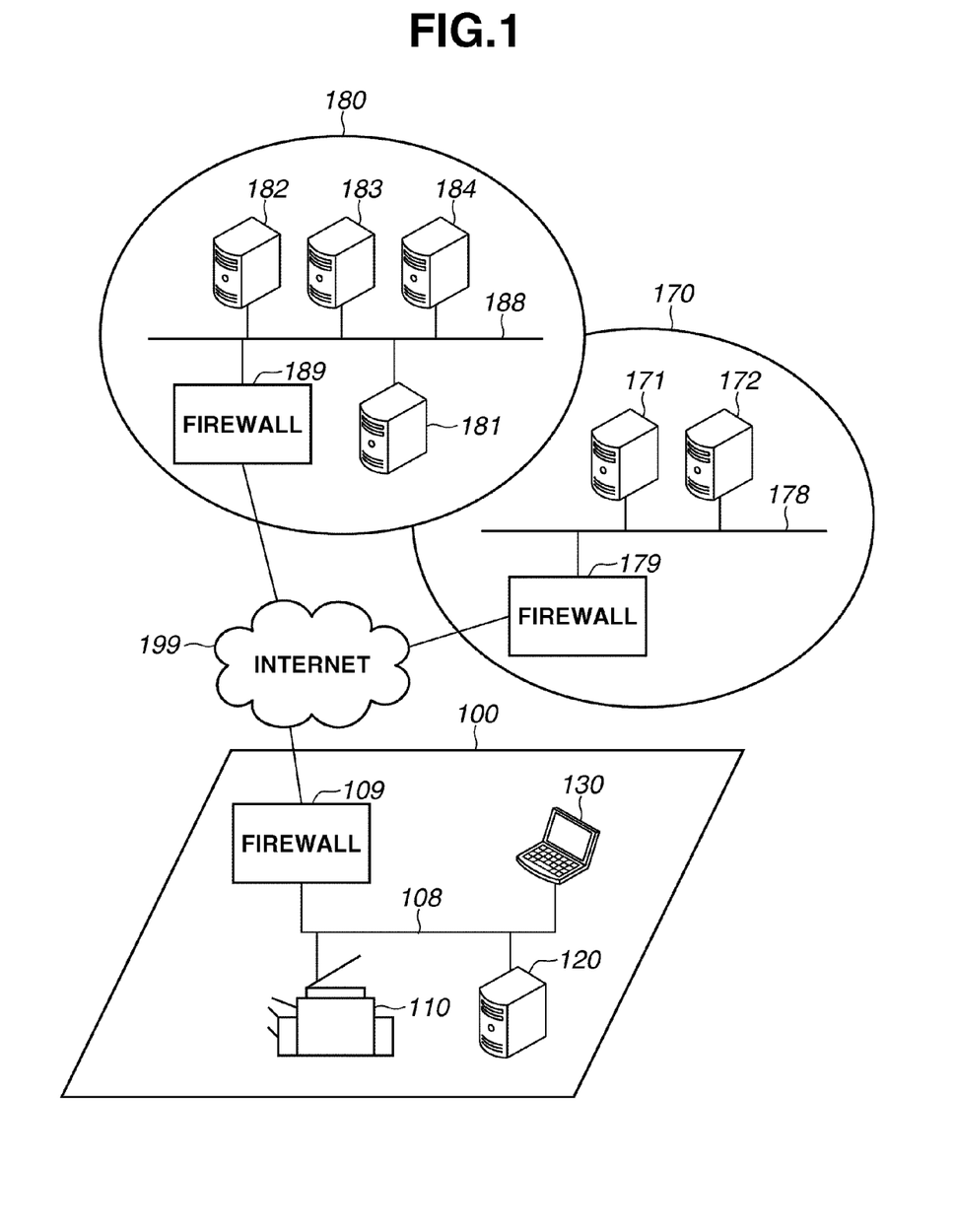
FIG. 1 illustrates an example of a network system according to an exemplary embodiment.

FIG. 1 illustrates an example of a network system according to an exemplary embodiment. The present exemplary embodiment is an example of a service processing system in which service processes executed by a plurality of information processing apparatuses connected to a network are made to cooperate to execute a series of data processes.

Specifically, the present exemplary embodiment is a network system in which, to execute a job, a server apparatus that functions as a routing server is provided on a network so that an information processing apparatus (personal computer (PC)) acting as a client can cooperatively execute the service processes in a plurality of service processing apparatuses.

The server apparatus uniformly manages a cooperation processing state between a PC as a service request source and a plurality of PCs (service processing apparatuses) executing the service processes requested from that PC. In addition, the server apparatus uniformly manages a service process execution destination so that a single job process is cooperatively executed by the plurality of PCs. Consequently, the dependency between the information processing apparatus acting as the client and the respective services to be cooperatively executed by each of the service processing apparatuses can be reduced.

An exemplary embodiment will now be described in which a server apparatus 181 receives a push print job from a PC 130 of a service request source, and the PC 130 connects to service processing apparatuses based on cooperation processing information instructed as a message from the server apparatus 181 and executes service processes. The cooperation processing information will be described in detail using FIGS. 3 and 4.

A data processing system 100 illustrated in FIG. 1 includes an image processing apparatus (multifunction peripheral (MFP)) 110 that has functions such as copying, printing, sending, boxing, and pull printing. The data processing system 100 also includes a PC 120 being a server apparatus that provides one or more services and a PC 130 being a client apparatus that requests service processes. The PC 120 and the PC 130 are respectively connected to a local area network (LAN) 108.

A firewall 109 connects the LAN 108 to the Internet 199. Further, the LAN 108 is also connected to other networks 170 and 180 via the Internet 199. The internal configuration of the networks 170 and 180 is the same configuration as the network 100.

In the network 170, information processing apparatuses (PCs) 171 and 172 are connected to a LAN 178. Similarly, in the network 180, a server apparatus 181 that functions as a server for executing a specific service process, and information processing apparatuses (PCs) 182, 183, and 184 are connected to a LAN 188. These networks are connected to the external Internet via firewalls 179 and 189, respectively.

The present exemplary embodiment includes information processing apparatuses that provide predetermined service processes and a server apparatus that functions as a routing server for uniformly managing the cooperation services that use that plurality of service processes. An example will now be described in which the routing server is the PC 181, and the information processing apparatuses that execute the service processes are the PCs 120, 171, 172, 182, 183, and 184. The information processing apparatus of the service request source is the PC 130.

Figure 3:
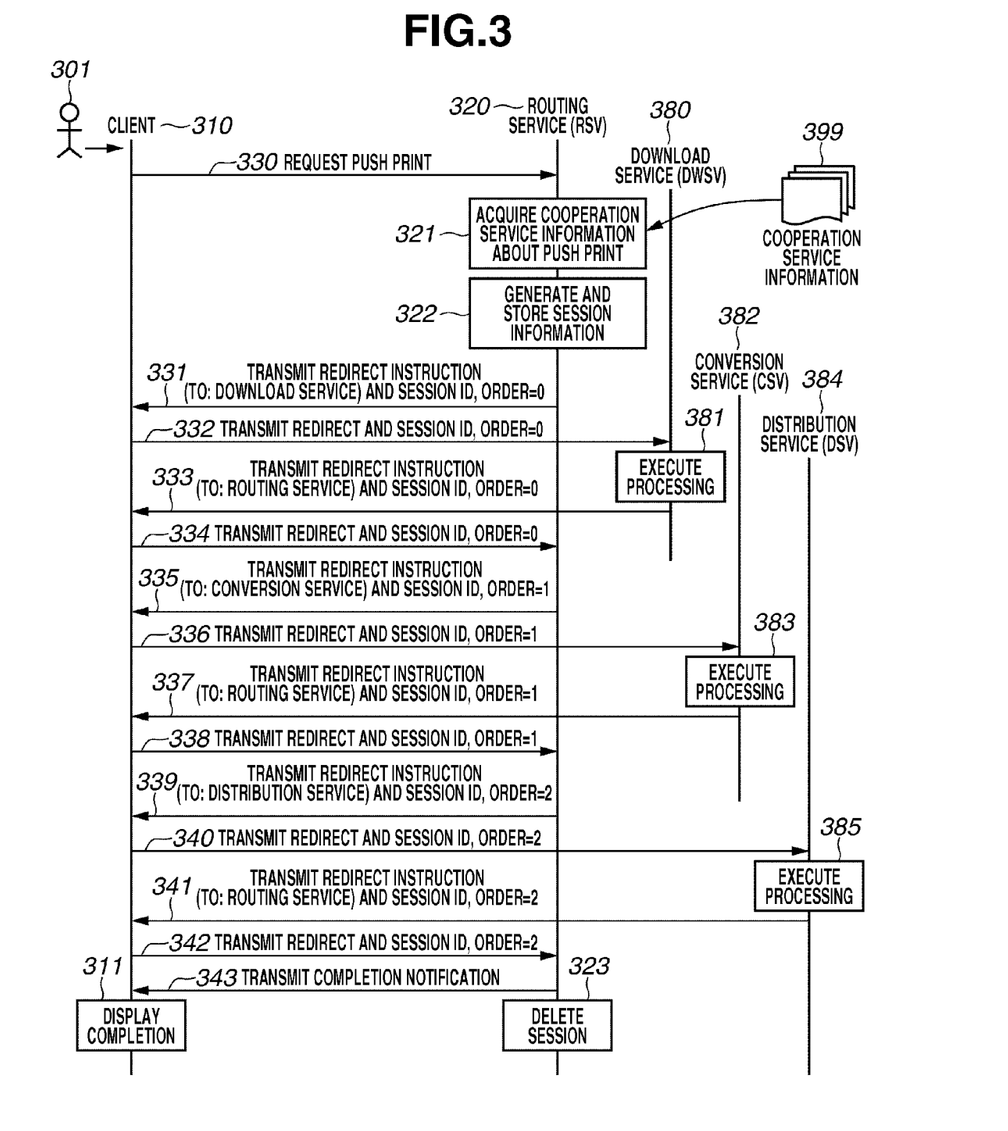
FIG. 3 illustrates an example of a print job processing sequence according to an exemplary embodiment.

In the thus-configured network system, the server apparatus 181 includes a function for specifying the service processing apparatuses that are to cooperatively execute a plurality of service processes based on one job request from the PC 130. In addition, the server apparatus 181 includes a function for uniformly managing the execution state of the service processes that are to be cooperatively executed between the respective specified service processing apparatuses and the PC of the service request source based on a sequence example as illustrated in FIG. 3. Further, the server apparatus 181 reduces the load for managing the service processing apparatuses executing the service processes to be managed by the PC (information processing apparatus) 130 of the service request source.

Therefore, before the start of a job processing request, the PC (information processing apparatus) 130 of the service request source does not need to be aware of information indicating the location of the service processing apparatus executing a predetermined service process, or the service processing order for processing the job. More specifically, the server apparatus that functions as a routing server is configured so that it can dynamically assemble a flexible system based on the system state when executing a job requested from the PC 130 of the service request source.

Consequently, it is no longer necessary for the PC 130 side to be aware of changes in the access destination, a service order, or a selection of a substitute service since the routing server can freely respond to changes in the access destination of the service processing apparatuses executing the service processes. Specifically, the dependency between the information processing apparatus acting as a client and the respective services to be cooperatively executed by the respective service processing apparatuses can be reduced.

Figure 2:
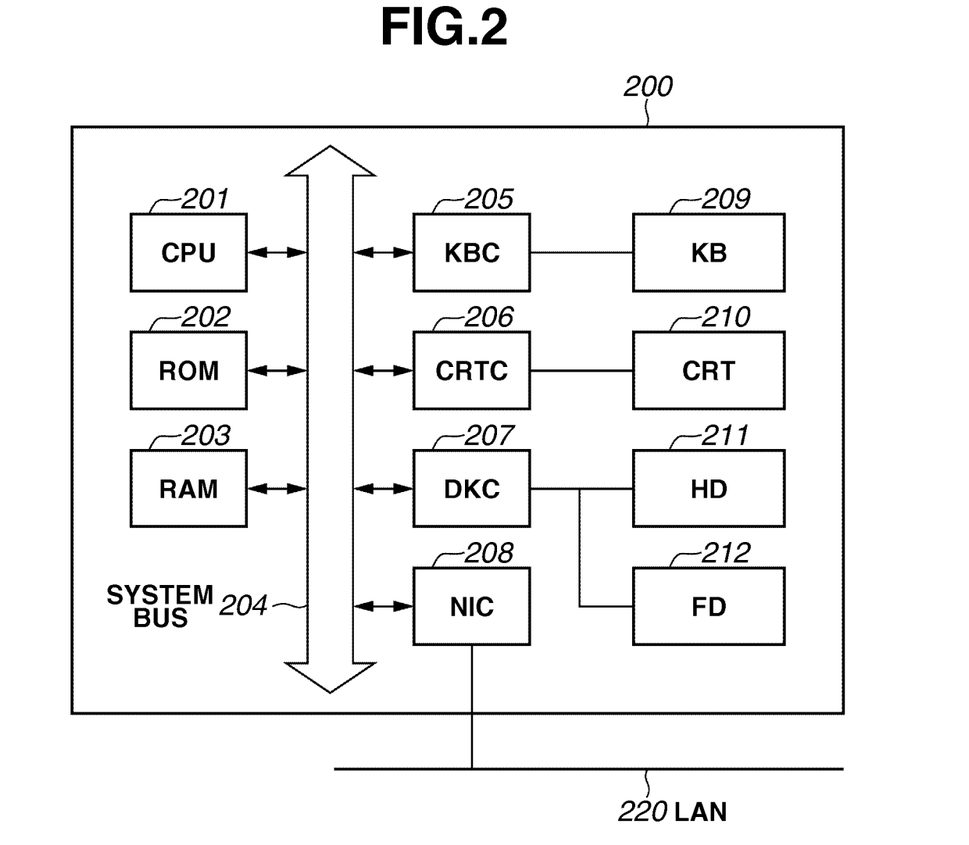
FIG. 2 is a block diagram illustrating a hardware configuration of an information processing apparatus illustrated in FIG. 1.

FIG. 2 is a block diagram illustrating a hardware configuration of the information processing apparatus illustrated in FIG. 1. The internal configuration of the PCs 120, 130, 171, 172, 182, 183, and 184 is as follows. Further, the PCs 120, 130, 171, 172, 182, 183, and 184 will be described below as a PC 200.

In the present exemplary embodiment, the PCs 182 and 120 are used as service processing apparatuses for executing service processes to be cooperatively executed based on a request from the PC 130, which acts up to cooperation processing information specified and instructed by the server apparatus.

In FIG. 2, the PC 200 includes a central processing unit (CPU) 201 that executes various software which is stored in a read-only memory (ROM) 202 or a hard disk (HD) 211, or which is supplied from a flexible disk drive (FD) 212. The CPU 201 performs overall control of the respective devices connected to a system bus 204.

A random access memory (RAM) 203 functions as a main memory or a work area of the CPU 201. A keyboard controller (KBC) 205 controls the input of instructions from a keyboard (KB) 209 or a pointing device which is not illustrated.

A cathode ray tube controller (CRTC) 206 controls the display of a CRT display (CRT) 210. A disk controller (DKC) 207 controls access to the hard disk (HD) 211 that stores boot programs, programs to perform embodiment operations, various applications, edit files, and user files. Further, the DKC 207 controls access to the flexible disk drive (FD) 212.

A network interface card (NIC) 208 exchanges data in both directions with a network printer, other network devices, or other PCs via a LAN 220. In the present exemplary embodiment, the LAN 220 is the same as the LANs 108, 178, and 188 illustrated in FIG. 1.

An example of the current problems that may occur in a conventional network system, especially when the dependency among services is large, will now be described. This example will be described based on the assumption that, in a cooperation system in which the dependency among services is large, a service having the following changes, for example, is executed.

A change in the service utilization sequence or a change in the service URL is the case. In a cooperation system, if the utilization sequence is changed, a service positioned at an earlier stage to that service, specifically, a service requesting processing to the service to be changed, needs to make the request based on a new changed service utilization sequence. More specifically, when changing the utilization sequence of a predetermined service, to provide the cooperation service that used that service, other services relating to the cooperation also have to be changed.

Similarly, when the URL of a predetermined service is changed, other services relating to the cooperation also have to be changed so that the changed URL can be recognized. Thus, if the dependency among the services is large, changing a predetermined service forces the other services to be changed as well, which leads to an increase in the number of changes and a decrease in the operation rate due to stoppage of the whole system during the changes.

In the present exemplary embodiment, to resolve the above problem, the server apparatus 181 executes a routing service in the network system.

As an example of the cooperation service processes realized in an embodiment, cooperation service processes for performing push printing of a document will be described. The push printing is configured from the following three services in the following order. Therefore, the cooperation service processes may be cooperatively executed with even more service processing apparatuses, and the number of services is not limited to "3".

In the push print service, the first service process is a download service for downloading a designated document to a designated location. Further, in the push print service, the second service process is a conversion service for converting the designated document into print data. In addition, in the push print service, the third service process is a distribution service for transmitting designated print data to a designated printer. In the following description, the download service and the conversion service are executed by the PC 182 illustrated in FIG. 1, and the distribution service is executed by the PC 120.

The programs realizing these first to third service processes are stored in the ROM 202 or the hard disk (HD) 211 as a hardware configuring each of the PCs, or are stored in the flexible disk drive (FD) 212. The CPU 201 in each of the PCs executes the respective service processes by loading a control program read from these memories into the RAM, and executing the control program.

The execution procedure of the respective service processes is controlled by the PC 181, which functions as a routing server. The processing will be described in more detail with reference to FIG. 3.

For the PC 181 providing the routing service, the program realizing the routing service is also stored in the ROM 202, the hard disk (HD) 211, or the flexible disk drive (FD) 212. The CPU 201 of the PC 181 realizes the routing service by loading the program into the RAM, and executing the program.

Similarly, for the PC 130 that functions as a client, the program requesting push printing is also stored in the ROM 202, the hard disk (HD) 211, or the flexible disk drive (FD) 212. The CPU 201 of the PC 130 realizes the process by loading a control program into the RAM, and executing the control program.

Communication between the PC 130 functioning as a client and the PCs 181, 182, and 120 functioning as a server is respectively performed via the LAN 220 using the NIC 208. The PC 102 functioning as a distribution server communicates with the image processing apparatus 110 connected to the LAN 108. This communication is similarly also performed via the LAN 220 using the NIC 208.

The present system may also be configured with the image processing apparatus 110 connected to a network which is not illustrated. Further, a plurality of image processing apparatuses 110 may be connected to the same network. Specifically, a system may be configured so that the processing is performed by splitting the print job into parts based on the respective job processing state when executing the print job.

FIG. 3 illustrates an example of a print job processing sequence in a network system according to the present exemplary embodiment. This is an example of a sequence corresponding to job processing (push print processing) based on a cooperation service.

In the following description, the entity which performs processing by the CPU 201 of the PC 130 is referred to as a client 310, and the entity which performs processing by the CPU 201 of the PC 181 and provides a routing service is referred to as a routing service (RSV) 320.

Similarly, the entity which performs processing by the CPU 201 of the PC 182 and provides a download service and a conversion service are referred to as a download service (DWSV) 380 and a conversion service (CSV) 382, respectively.

Similarly, the entity which performs processing by the CPU 201 of the PC 120 and provides a distribution service is referred as a distribution service (DSV) 384. In the following example, push printing is performed by cooperatively executing the first to third service processes, and by having the routing service (RSV) 320 control the processing order between these services and the client 310. The PC 130 as a client is configured so that it can realize a browser function.

In the present exemplary embodiment, the first service process corresponds to the download service process, the second service process corresponds to the conversion service process, and the third service process corresponds to the distribution service process.

Further, in the present exemplary embodiment, messages 332, 336, and 340 are cooperation processing information notified to the PCs 182 and 120, which function as service processing apparatuses, from the PC 130, which functions as an information processing apparatus. These messages are configured from a uniform resource identifier (URI) 481, for example. In the present exemplary embodiment, the cooperation processing information is set in a URI query parameter.

The cooperation processing information includes location information for connecting the PC 130 to a service processing apparatus and session information indicating a cooperation process. This session information includes a session ID and order information as progress information about a service process (information specifying a service process order). The order information is sequentially configured by the server apparatus 181 executing the RSV 320.

In FIG. 3, the client 310 issues a push print request to the RSV 320. The push printing is provided by a cooperation service that executes processing in the following order: download service (DWSV) 380, conversion service (CSV) 382, and distribution service (DSV) 384.

Applying this to the network system example illustrated in FIG. 1, the client 310 is the PC 130, and the RSV 320 is provided by the PC 181. A message 399 is used as cooperation service information that includes location information about the plurality of information processing apparatuses that are to execute the cooperation service processes. The message 399 is stored in a memory device in the server apparatus 181 so that it can be updated. More specifically, when a job request from the PC 130 is specified, the server apparatus 181 acquires the cooperation service information from the memory device, and determines a processing path and a processing order of the plurality of service processing apparatuses that are to be cooperatively executed in response to the job request.

Since this example is an example of a push print job, service processing apparatuses for executing three service processes are specified based on the cooperation service information.

Similarly, the DWSV 380 and the CSV 382 are provided by the PC 182 in FIG. 1, and the DSV 384 is provided by the PC 120, respectively.

First, based on an instruction from a user 301 or a request from a program, the client 310 transmits a message 330 to the RSV 320 and requests push printing. In process 321, the RSV 320, which has received the message 330, searches and acquires cooperation service information about the push printing. The cooperation service information defines the details of the cooperation service processes configured from one or more service processes.

Further, in process 322, the RSV 320 generates session information for providing the service for which a request was received in the message 330 from the client 310. Then, the RSV 320 stores the cooperation service information acquired in process 321 as a part of the session information.

The session information has a session ID for identifying itself, so that the data relating to the session can be managed. Further, the session information may be arbitrary information, as long as it can be stored and extracted by the routing service. An example of the storage location of the session information is a memory device included in the server apparatus 181 that provides the routing service.

The session information generated by the RSV 320 not only includes location information (e.g., an URL) about the service processing apparatus that is to request the service process confirmed based on the contents of the request from the client 310, but also includes the service combination order. The client 310, which is the request source, cannot only change the location information (e.g., URL) that is to request the service process, but can also make a request to the service processing apparatus for a service process even if it does not grasp the service combination order.

For example, it is no longer necessary for the configuration of service A to be formed from services 1, 2, and 3, or for this service to be performed in the order of the services 1→2→3, or for the request source client 310 to be aware of selection of a substitute service due to a failure, for example.

Next, the RSV 320 transmits a message 331 to the client 310 as a response to the message 330. The content of this message is an instruction to the client 310 to redirect to the DWSV 380. Further, this message 331 is transferred together with a session ID for identifying the session generated in process 322 and order information.

The order information used as progress information about the service process indicates the cooperation service order based on a number starting from "0". In the message 331, the order value is "0", indicating that the redirect destination DWSV 380 is the first cooperation service.

The client 310, which has thus received the message 331 from the RSV 320, transmits a message 332 to the DWSV 380 based on the instruction contents of the redirect. At this stage, the client 310 transfers the session ID and the order=0 received in the message 331 as information. The DWSV 380 receives the message 332 from the client 310, and then executes processing 381. A specific exemplary embodiment of the operations performed in process 381 will be described below using the network system illustrated in FIG. 1 as an example.

The server apparatus 182 communicates with the PC 130 to make the PC 130 display a screen that allows the user to specify a document to be downloaded and a document storage area, and then wait for a user operation. Based on instructions from the user, the PC 130 specifies the document in the PC 171 and the storage area. Based on the information specified by the PC 130, the PC 182 downloads the document in the PC 171 specified by the PC 130 to the specified location. Then, after executing process (the service process) 381, the DWSV 380 transmits a message 333 to the PC 130 as a response.

The content of the response from the DWSV 380 to the client 310 (PC 130) is a redirect instruction for accessing the RSV 320, so that the session ID and order=0 received in the message 332 are transferred to the client 310.

The client 310 receives the message 333, and, based on that instruction, transmits a message 334 (response information) to the RSV 320. This message 334 includes the session ID and the order=0 received in the message 333 from the download service 380 as information.

The RSV 320 receives the message 334 from the client 310, and then extracts the cooperation service information in the stored session information from the received session ID. Since the value of this order information in the cooperation service information and the message 334 is "0", this means that the next service is the CSV 382, which is positioned second.

Therefore, the RSV 320 generates a message 335, which is an instruction to the client 310 to redirect to the CSV 382, and transmits the message 335 to the client 310 as a response to the message 334. The message 335 includes the session ID described in the message 334, and order="1", which has been updated. Specifically, the message 335 indicates that the cooperation processing has progressed by one step.

The client 310 receives the message 335 from the RSV 320, and then transmits a message 336 to the CSV 382 based on the content of that message. The message 336 includes the session ID and the order=1 described in the message 335 as information.

The CSV 382 receives the message 336 from the client 310, and then executes processing 383. A specific exemplary embodiment of the operations performed in the process 383 will now be described using the network system illustrated in FIG. 1 as an example.

The server apparatus 182 communicates with the PC 130 to make the PC 130 display a screen that allows the user to specify the document to be converted and a storage area for storing the converted print data, and then wait for a user operation. Based on instructions from the user, the client PC 130 specifies the document to be converted and the storage area for storing the print data. Based on the information, the server apparatus 182 converts the specified document into print data, and stores the print data in the specified area.

The CSV 382 executes processing 383, and then transmits a message 337 to the client 310 as a response. The content of the response is a redirect instruction for accessing the RSV 320, so that the session ID and order=1 received in the message 336 are transferred to the client 310.

The client 310 receives the message 337 from the CSV 382, and, based on that instruction, transmits a message 338 to the RSV 320. This message 338 includes the session ID and the order=1 received in the message 337 as information. The RSV 320 receives the message 338 from the client 310, and then extracts the cooperation service information in the stored session information from the received session ID.

Since the value of this order information in the message 338 for the cooperation service information is "1", this means that the next service to be requested is the DSV 384, which is positioned third. Therefore, the RSV 320 generates a message 339, which is an instruction to the client 310 to redirect to the DSV 384, and transmits the message 339 to the client 310 as a response to the message 338. The message 339 includes the session ID described in the message 338, and order="2", which has been updated.

The client 310 receives the message 339 from the RSV 320, and then transmits a message 340 to the DSV 384 based on the content of that message. The message 340 includes the session ID and the order=2 described in the message 339 as information. The DSV 384 receives the message 340 from the client 310, and then executes processing 385. A specific exemplary embodiment of the operations performed in the process 385 will now be described using the network system illustrated in FIG. 1 as an example.

The PC 120 communicates with the PC 130 to make the PC 130 display a screen that allows the user to specify a printer for executing printing and print data, and then wait for a user operation. Based on a user operation, the client PC 130 specifies the MFP 110 as a printer, and specifies the print data obtained by the CSV 382. Based on the specified information, the PC 120 transmits the specified print data to the specified printer (the MFP 110), and executes printing.

The DSV 384 executes processing 385, and then transmits a message 341 to the client 310 as a response. The content of this response is a redirect instruction for accessing the RSV 320 again, so that the session ID and order=2 received in the message 340 are transferred to the client 310.

The client 310 receives the message 341 from the DSV 384, and, based on that instruction, transmits a message 342 to the RSV 320. This message 342 includes the session ID and the order=2 received in the message 341 as information. The RSV 320 receives the message 342, and then extracts the cooperation service information in the stored session information from the received session ID.

Since the number of services cooperatively provided in the example illustrated in FIG. 3 is "3", the value of the order information in the message 342 is "2". Consequently, the RSV 320 knows that the cooperation service has been completed. Therefore, the RSV 320 generates a message 343 as a completion notification, transmits the message to the client 310, and in process 323, deletes the session information identified by the session ID. The client 310 receives the message 343 from the RSV 320, and then in process 311, performs a completion display as the processing which is performed at the time of completion.

Figure 4:
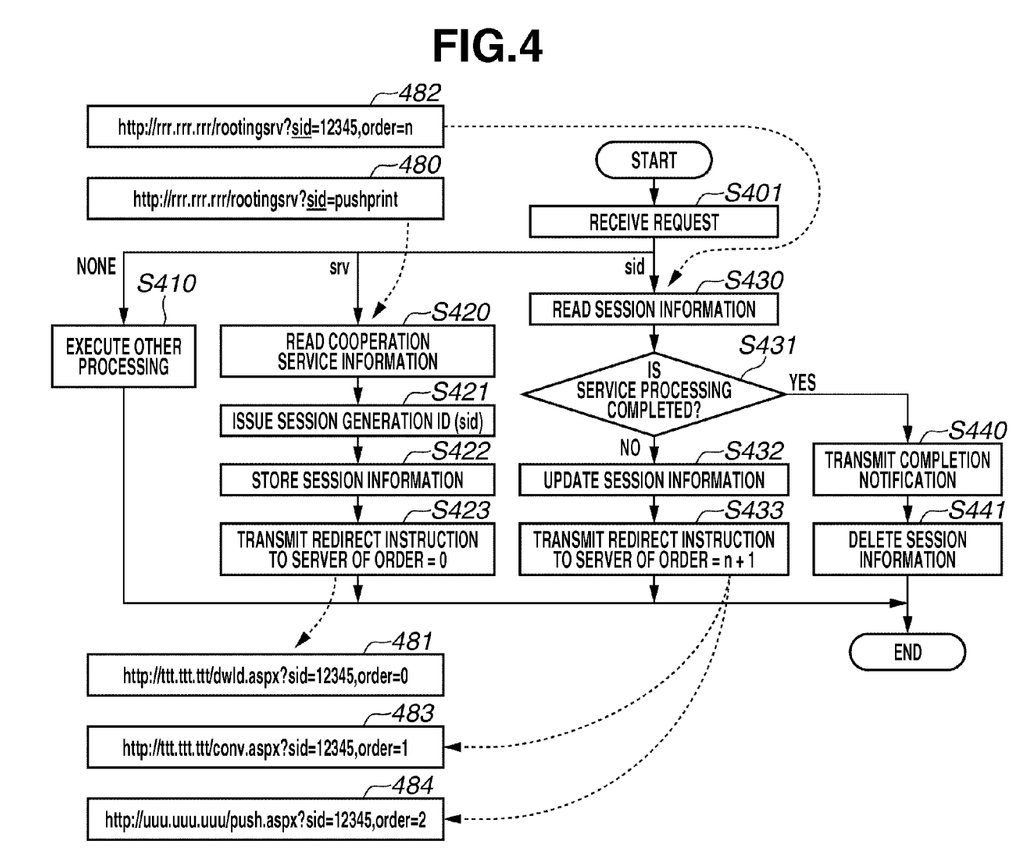
FIG. 4 is a flowchart illustrating an example of a data processing procedure in a server apparatus.

FIG. 4 is a flowchart illustrating an example of a data processing procedure in a server apparatus according to the present exemplary embodiment. This example corresponds to the processing performed when the RSV 320 illustrated in FIG. 3 receives a request from the client 310.

This request from the client corresponds to, in the example illustrated in FIG. 3, messages 330, 334, 338, and 342. The exemplary embodiment illustrated in FIG. 4 is an example of a push print cooperation service in which a query parameter is used for a redirect instruction. The message 330 from the client 310 to the RSV 320 first requesting a cooperation service will below be referred to as a service start request message.

Further, the messages 334, 338, and 342 requesting a redirect instruction to the next service after the processing for one of the cooperation services has been completed will below be referred to as a service completion message. Each of the processes illustrated in the flowchart of FIG. 4 is realized by the CPU 201 of the PC 200 executing a control program stored in the HDD 211.

When executing the control program corresponding to the flowchart of FIG. 4, the CPU 201 of the PC 200 functions as the RSV 320 illustrated in FIG. 3.

In step S401, when the RSV 320 receives a message from the client 310, the RSV 320 splits the processing based on the content of the message. The message (service start request message) 330 illustrated in FIG. 3, which is transmitted from the client 310, has a URI.

In FIG. 4, as an example of the cooperation processing information, "srv=pushprint" is described in the query parameter (URI 480). This indicates that the message is a service start request message requesting that push printing be started.

In step S401, the RSV 320 receives the service request start message ("srv" in step S401), and the processing proceeds to step S420. In step S420, the RSV 320 extracts the cooperation service information about the requested push printing among the plurality of pieces of cooperation service information. Then, the RSV 320 generates a session, and stores the session information in a memory.

Specifically, in step S421, the RSV 320 generates session information and issues an ID for identifying the generated session. Then, in step S422, the RSV 320 stores the generated information as session information in a memory. Next, in step S423, the RSV 320 transmits to the client 310 a response (message 331) instructing the redirect destination to the server providing the first service based on the acquired cooperation service information.

An example of the URI of this redirect destination is a URI 481. The URI 481 is an example of location information, in which the session information and the order information are instructed as a query parameter. This indicates that a processing request was made to http://ttt.ttt.ttt/dwld.aspx, and that the session ID of this cooperation service session is "12345".

Further, the order information for this process is "0", which indicates that this is the first process in the cooperation service. After step S423 is finished, the processing performed in this flowchart ends.

Each of the messages (the service completion messages for each service process) 334, 338, and 342 transmitted from the client 310 in FIG. 3 has a URI.

In FIG. 4, as an example, sid=12345 and order=n are described in the query parameter (URI 482). This indicates the fact that this message is a service completion message notifying that the service having order=n among the cooperation processes in session ID=12345 has been completed. However, the value of n is different for messages 334, 338, and 342. In the example illustrated in FIG. 3, this value is 0, 1, and 2. Here, order=n is used as information indicating the progress state of the service processes.

In step S401, the RSV 320 receives a service completion message ("sid" in step S401), and the processing proceeds to step S430. In step S430, the RSV 320 reads the session information stored in the memory based on the session ID. For the URI 482 example illustrated in FIG. 4, the RSV 320 reads the session information for the session ID=12345.

Next, in step S431, the RSV 320 determines whether there is a service process to be cooperatively executed next based on the session information and the order information. If there is no next cooperation service, the RSV 320 determines that the service processes have been completed (YES in step S431), and the processing proceeds to step S440.

In step S440, the RSV 320 transmits a completion notification to the client 310. Then, in step S441, the RSV 320 deletes the session information, and the processing in this flowchart ends.

On the other hand, in step S431, if the RSV 320 determines that there is a service process to be executed next (NO in step S431), the processing proceeds to step S432. In step S432, the RSV 320 updates the session information for the next service process. Then, in step S433, the RSV 320 transmits to the client 310 the message 335 indicating an order value of n+1, specifically, an instruction to redirect to the n+2th server, and the processing in the flowchart ends.

A URI 483 illustrated in FIG. 4 is an example of the redirect content instructed in the message 335 transmitted to the client 310 from the RSV 320. This indicates that a processing request is made to http://ttt.ttt.ttt/conv.aspx, and that the session ID of this cooperation service session is "12345". More specifically, this indicates that this message 335 instructs the client 310 to redirect to the conversion service 382.

Further, the order information for this process is "1", indicating that the process is the second process in the cooperation service. Similarly, a URI 484 is an example of the redirect content instructed in the message 339 transmitted to the client 310 from the RSV 320. This indicates that a processing request is made to http://uuu.uuu.uuu/push.aspx, and that the session ID of this cooperation service session is "12345". More specifically, this indicates that the message 339 instructs the client 310 to redirect to the DSV 384. Further, the order information for this process is "2", indicating that the process is the third process in the cooperation service. When step S433 is finished, the processing in the flowchart ends.

In step S401, if the RSV 320 determines that a message other than a service start request message or a service completion message was received ("NONE" in step S401), the processing proceeds to step S410. In step S410, the RSV 320 executes other processing appropriate to the message received from the client 310, and the processing in the flowchart ends. An example of the processing performed in step S410 includes an error response when an unexpected message is received.

Figure 5:
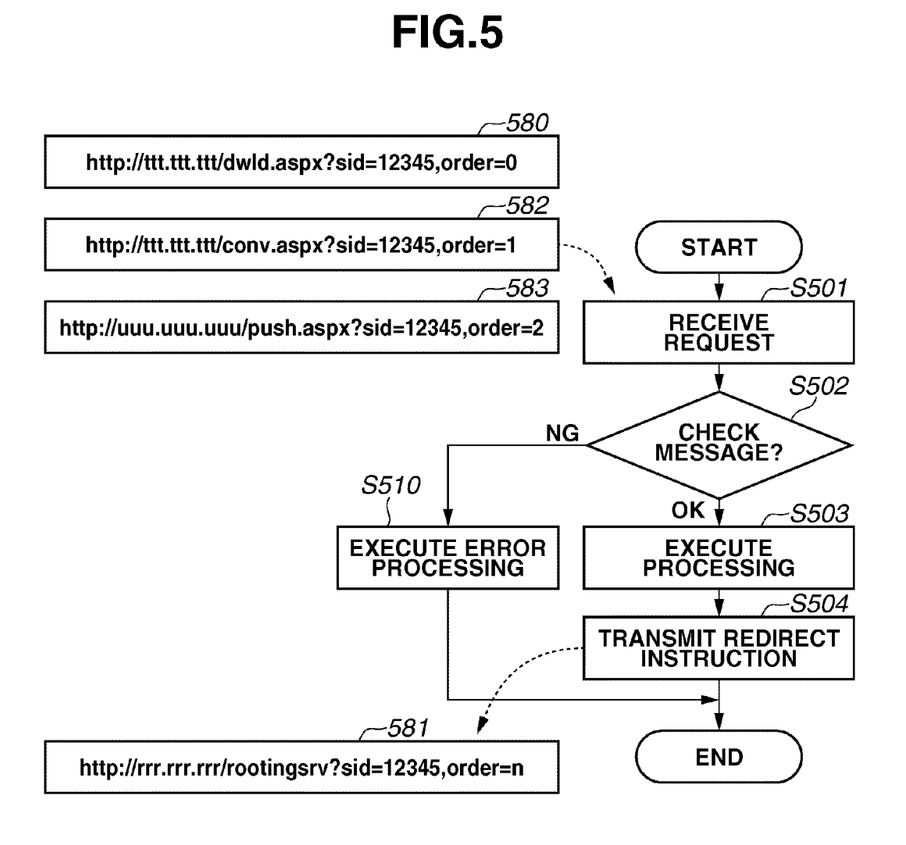
FIG. 5 is a flowchart illustrating an example of a data processing procedure in an information processing apparatus.

FIG. 5 is a flowchart illustrating an example of a data processing procedure in an information processing apparatus according to the present exemplary embodiment. This is an example of the processing performed in the DWSV 380, the CSV 382, and the DSV 384 illustrated in FIG. 3 when a request from the client 310 is received.

The request from the client 310 corresponds to, in the example illustrated in FIG. 3, messages 332, 336, and 340. Similar to FIG. 4, the exemplary embodiment illustrated in FIG. 5 is an example of a push print cooperation service in which a query parameter is used for the redirect instruction. Further, the messages 332, 336, and 340 requesting one of the cooperation service processes will be referred to below as a service process request message.

Each of the processes illustrated in the flowchart of FIG. 5 is realized by the CPU 201 of the PC 200 executing a control program stored in the HDD 211. When executing the control program corresponding to the flowchart of FIG. 5, the CPU 201 of the PC 200 functions as the RSV 320 illustrated in FIG. 3.

In step S501, the RSV 320 receives a service process request message from the client 310. The service process request message has a URI. In the example illustrated in FIG. 5, a URI 580, a URI 582, and a URI 583 are respectively illustrated as an example of the messages 332, 336, and 340 in FIG. 3.

The URI 580 is a URI that is included in the message 332, which specifies http://ttt.ttt.ttt/dwld.aspx as a service for which process execution is requested. Further, sid=12345 and order=0 are described as a query parameter.

This indicates that, among the cooperation processes in session ID=12345, execution of the order=0 service is requested. Similarly, the URI 582 is a URI that is included in the message 336, which specifies http://ttt.ttt.ttt/conv.aspx as a service for which process execution is requested.

In addition, sid=12345 and order=1 are described as a query parameter. This indicates that, among the cooperation processes in session ID=12345, execution of the order=1 service is requested. The URI 583 is a URI that is included in the message 340, which specifies http://uuu.uuu.uuu/push.aspx as a service for which process execution is requested.

Moreover, sid=12345 and order=2 are described as a query parameter. This indicates that, among the cooperation processes in session ID=12345, execution of the order=2 service is requested.

Next, in step S502, the DWSV 380, the CSV 382, and the DSV 384 check the content of the message received from the client 310. For example, if these services determine that the message content indicates that cooperation processing cannot be continued, for example, a case where there is no session ID description ("NG" in step S502), the processing proceeds to step S510. In step S510, error processing is performed, and the processing performed in this flowchart ends.

On the other hand, if the DWSV 380, the CSV 382, and the DSV 384 determine in step S502 that the message content is OK, the processing proceeds to step S503. In step S503, the DWSV 380, the CSV 382, and the DSV 384 execute the process requested from the client 310.

Next, in step S504, the DWSV 380, the CSV 382, and the DSV 384 transmit a response instructing the client 310 to redirect to the RSV 320, and the processing in this flowchart ends. A URI 581 illustrated in FIG. 5 is an example of that redirect destination URI.

In the URI 581, sid=12345 and order=n are described as a query parameter. This indicates that, among the cooperation processes in session ID=12345, the order=n service process has been completed. However, each of the messages 333, 337, and 341 includes a different value for "n", and, in the example illustrated in FIG. 3, the value in the messages becomes n=0, 1, and 2, respectively.

Explaining this in conjunction with the sequence in FIG. 3, in step S503, the DWSV 380, which received in step S501 the message 332 including the URI 580, provides a download service to the client 310. Then, in step S504, the DWSV 380 transmits the message 333 including the URI 581 in which n=0 to the client 310.

Similarly, in step S503, the CSV 382, which has received the message 336 including the URI 582, provides a conversion service to the client 310. Then, in step S504, the CSV 382 transmits the message 337 including the URI 581 in which n=1 to the client 310. Further, the DSV 384, which has received the message 340 including the URI 583, provides a distribution service to the client 310. Then, in step S504, the DSV 384 transmits the message 341 including the URI 581 in which n=2 to the client 310.

According to the present exemplary embodiment, when cooperatively processing one job using three services spread over a plurality of service processing apparatuses, it is no longer necessary for the client to recognize that a service 1 first, then a service 2, and then a service 3 are used. The information processing apparatus acting as a client no longer needs to grasp the service execution order, so that the client/service interdependency can be reduced. To put it the other way round, when executing a requested job, the information processing apparatus acting as a client no longer needs to be aware of which service processing apparatus is to execute a service process.

Further, when the URL of the server providing the service 2 has changed, or when selecting the optimum server based on the load state or operational state if there is a plurality of servers providing the same service 2, the information processing apparatus acting as a client no longer needs to be aware of that information. Consequently, dependency among the services can be reduced.

In the above first exemplary embodiment, FIGS. 4 and 5 illustrate an exemplary embodiment in which a session ID and order information are transmitted as a message using a query parameter. However, this is merely an example. As another example, a method may be employed in which these pieces of information are described in a body of HyperText Transfer Protocol (HTTP), and a query parameter is not used in the URI. This exemplary embodiment will now be described below.

Figure 6:
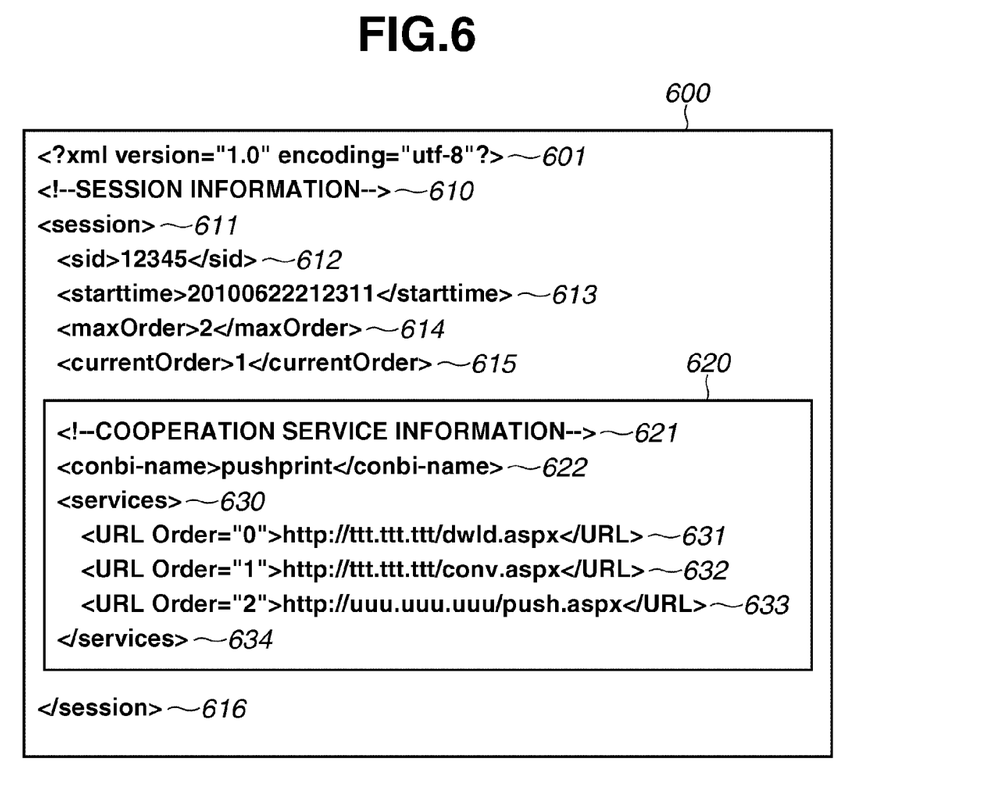
FIG. 6 illustrates an example of session information that is processed by a server apparatus.

FIG. 6 illustrates an example of session information that is processed by the server apparatus according to the present exemplary embodiment. This is an example of the session information generated by the RSV 320 in step S421 of FIG. 4, or updated in step S432, or deleted in step S441. This example illustrates a case in which the session information is described in extensible markup language (XML).

In FIG. 6, a line 601 is an XML declaration. A line 610 is a comment line indicating that "session information" is described in the following lines. A line 611 is a session information start tag. A line 612 is a session ID, which is the ID generated in process 421. A line 613 indicates the date and time information generated by this session.

A line 614 describes the maximum order value of the cooperation service to be executed in this session. A line 615 is the order value of the service that is currently being executed in the cooperation service. Information 620 is cooperation service information, which is an example of the information searched from the message 399 in FIG. 3 and read in process 420 in FIG. 4.

A line 621 is a comment line. A line 622 is a name that uniquely indicates the cooperation service information. Here, the line 622 indicates that the name of this cooperation service information is "push printing". A line 630 is a start tag for a list display of the cooperation service.

A line 631 is an order=0 service, indicating that the URL is http://ttt.ttt.ttt/dwld.aspx. Similarly, a line 632 is an order=1 service, indicating that the URL is http://ttt.ttt.ttt/conv.aspx. A line 633 is an order=2 service, indicating that the URL is http://uuu.uuu.uuu/push.aspx. A line 634 is a completion tag for the list display of the cooperation service. A line 616 is a completion tag for the session information.

In the above exemplary embodiment, push printing was described as an example of a service process. However, embodiments can be provided for any service process as long as such service process is executed, in an environment utilizing a network resource, for example, a cloud computing environment, by a system having a plurality of information processing apparatuses that cooperate with one another.

Thus, based on the present exemplary embodiment described in detail above, transition can be performed in which unnecessary data is deleted by a data definition file during the installation of an application even when the data to be handled by the application is different.

Each of the steps executed can also be realized by executing software (a program) acquired via a network or from various storage media using a processing apparatus (a CPU or a processor) of a computer.

Aspects can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium). In an example, a computer-readable medium may store a program that causes an apparatus to perform a method described herein. In another example, a central processing unit (CPU) may be configured to control at least one unit utilized in a method or apparatus described herein.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2010-193224 filed Aug. 31, 2010, which is hereby incorporated by reference herein in its entirety.

What is claimed is:

1. A network system including a server apparatus configured to manage a service processing apparatus which, based on a job requested from an information processing apparatus, cooperatively processes the job, the network system comprising:

the server apparatus, which includes:
a storage unit configured to store cooperation service information that includes location information about a plurality of service processing apparatuses that are to execute a cooperation service process specified based on the requested job, a first generation unit configured to generate, based on the cooperation service information stored in the storage unit, cooperation processing information including location information about a service processing apparatus to which the information processing apparatus is to make a cooperation service request and session information indicating a cooperation process, an instruction unit configured to instruct the information processing apparatus about the cooperation processing information generated by the first generation unit, and an acquisition unit configured to acquire from the information processing apparatus response information corresponding to the cooperation processing information, wherein the instruction unit instructs the information processing apparatus about cooperation processing information to be generated next by the first generation unit based on the response information acquired by the acquisition unit;

the information processing apparatus, which includes:
a request unit configured to make a request for a service process to a service processing apparatus specified based on cooperation processing information instructed from the server apparatus, a reception unit configured to receive from the service processing apparatus response information including the cooperation processing information corresponding to the service process, and a first notification unit configured to notify the server apparatus of response information including the cooperation processing information received by the reception unit, wherein the reception unit makes a connection to request for a cooperation service to the next service processing apparatus that is to execute the service process by cooperatively executing the job processing request based on the next cooperation processing information instructed from the server apparatus; and the service processing apparatus, which includes:

a second generation unit configured to generate response information including cooperation processing information to be notified to the server apparatus with regard to the service process requested from the information processing apparatus, and a second notification unit configured to notify the information processing apparatus of the response information including the cooperation processing information generated by the second generation unit.

2. A method for a network system including a server apparatus configured to manage a service processing apparatus which, based on a job requested from an information processing apparatus, cooperatively processes the job, the method comprising:

storing, via the server apparatus, cooperation service information that includes location information about a plurality of service processing apparatuses that are to execute a cooperation service process specified based on the requested job;

generating, via the server apparatus and based on the stored cooperation service information, cooperation processing information including location information about a service processing apparatus to which the information processing apparatus is to make a cooperation service request and session information indicating a cooperation process;

instructing, via the server apparatus, the information processing apparatus about the generated cooperation processing information; and acquiring, via the server apparatus from the information processing apparatus, response information corresponding to the cooperation processing information, wherein instructing includes instructing the information processing apparatus about cooperation processing information to be generated next based on the acquired response information;

making a request, via the information processing apparatus, for a service process to a service processing apparatus specified based on cooperation processing information instructed from the server apparatus;

receiving, via the information processing apparatus from the service processing apparatus, response information including the cooperation processing information corresponding to the service process;

notifying, via the information processing apparatus, the server apparatus of response information including the received cooperation processing information, wherein receiving includes making a connection to request for a cooperation service to the next service processing apparatus that is to execute the service process by cooperatively executing the job processing request based on the next cooperation processing information instructed from the server apparatus;

generating, via the service processing apparatus, response information including cooperation processing information to be notified to the server apparatus with regard to the service process requested from the information processing apparatus; and notifying, via the service processing apparatus, the information processing apparatus of the response information including the generated cooperation processing information.

3. A non-transitory computer-readable storage medium storing a program that causes a network system to execute a method, wherein the network system includes a server apparatus configured to manage a service processing apparatus which, based on a job requested from an information processing apparatus, cooperatively processes the job, the method comprising:

storing, via the server apparatus, cooperation service information that includes location information about a plurality of service processing apparatuses that are to execute a cooperation service process specified based on the requested job;

generating, via the server apparatus and based on the stored cooperation service information, cooperation processing information including location information about a service processing apparatus to which the information processing apparatus is to make a cooperation service request and session information indicating a cooperation process;

instructing, via the server apparatus, the information processing apparatus about the generated cooperation processing information; and acquiring, via the server apparatus from the information processing apparatus, response information corresponding to the cooperation processing information, wherein instructing includes instructing the information processing apparatus about cooperation processing information to be generated next based on the acquired response information;

making a request, via the information processing apparatus, for a service process to a service processing apparatus specified based on cooperation processing information instructed from the server apparatus;

receiving, via the information processing apparatus from the service processing apparatus, response information including the cooperation processing information corresponding to the service process;

notifying, via the information processing apparatus, the server apparatus of response information including the received cooperation processing information, wherein receiving includes making a connection to request for a cooperation service to the next service processing apparatus that is to execute the service process by cooperatively executing the job processing request based on the next cooperation processing information instructed from the server apparatus;

generating, via the service processing apparatus, response information including cooperation processing information to be notified to the server apparatus with regard to the service process requested from the information processing apparatus; and notifying, via the service processing apparatus, the information processing apparatus of the response information including the generated cooperation processing information.

* * * * *